Figure 1:
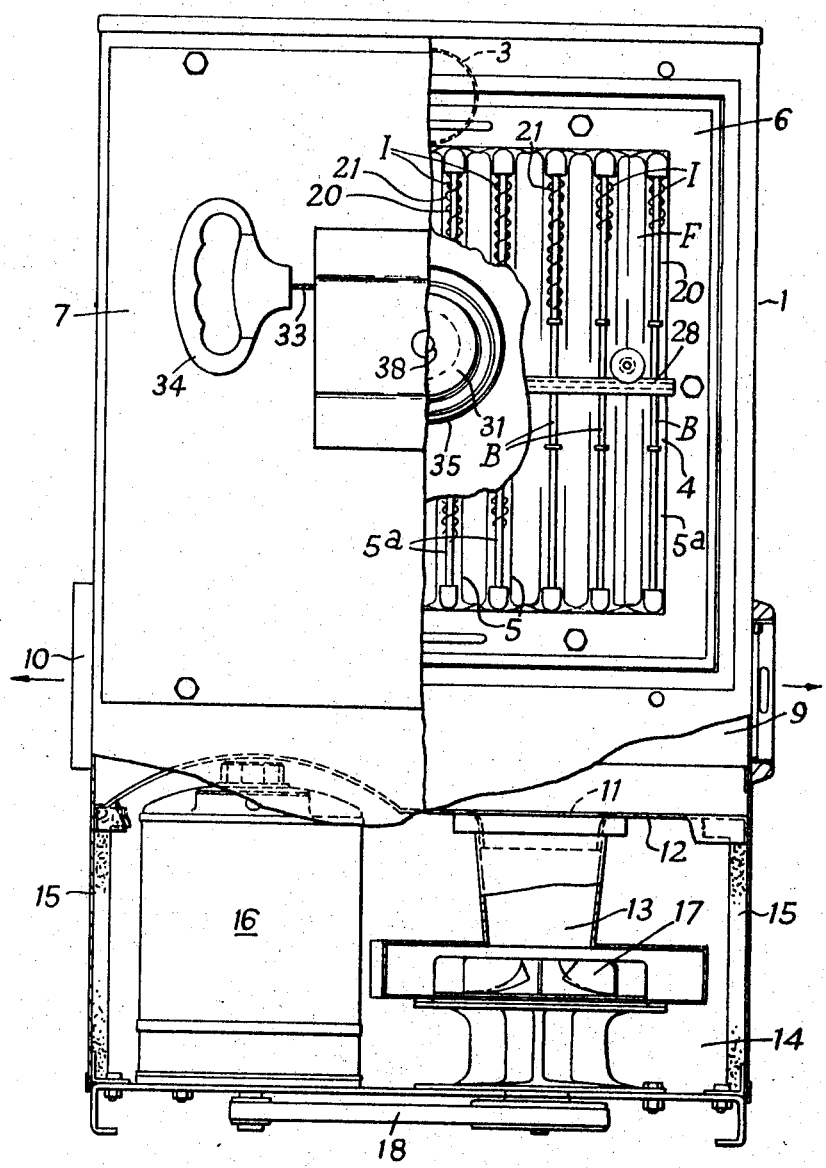

Feb. 13, 1968   R. H. BAXENDALE   3,368,331
UNIT FOR FILTERING DUST-LADEN AIR
Filed Jan. 29, 1964   6 Sheets-Sheet 1

United States Patent Office 3,368,331
Patented Feb. 13, 1968

3,368,331
UNIT FOR FILTERING DUST-LADEN AIR
Richard H. Baxendale, Glenfield, Leicester, England, assignor to Dust Control Equipment Limited, Leicester, England
Filed Jan. 29, 1964, Ser. No. 341,033
Claims priority, application Great Britain, Jan. 31, 1963, 3,936/63
16 Claims. (Cl. 55—299)

This invention appertains to dust collector units for the filtering and collection of dust-laden air, which latter term is used in a generic sense and is intended to include any appropriate gas other than air.

The invention is applicable to dust collectors of the class adopted for use with various kinds of machines and apparatus used in, say, the engineering, chemical, food and other industries for the purpose of carrying away dust-laden air from around rotary tools and other moving components of such machines and apparatus.

Furthermore, the invention relates to such units of a previously proposed form comprising a casing provided with an inlet for dust-laden (contaminated) air and at least one outlet for the discharge therefrom of cleaned air, and a filter assembly including a bank of filter bags or pockets, which are pervious to air being arranged side by side in closely spaced relation for the purpose of collecting fine dust on the outsides of said bags or pockets, and incorporating inserts of an open character which hold apart sides of the bags or pockets to keep the latter open in use and yet permit of the free passage of air therethrough, each of said inserts consisting of a relatively rigid frame of the same shape as and dimensioned to fit within the corresponding bag or pocket, and a normally flat flexible mattress secured right around its periphery to the said frame, the central portion of the mattress being laterally displaceable from and to opposite sides of a plane containing the frame for the purpose of beating the sides of the bag or pocket. A bag or pocket together with its insert is sometimes referred to as a "filter pad."

As well known to those acquainted with the art, it is essential for the permeability of the filtering medium to be periodically restored by removing from the latter at least a substantial part of the retained solids. In a dust collector unit of the form herein referred to filter cleaning is customarily achieved by mechanical means designed to effect vibration of the flexible mattresses within the bags or pockets and so cause dislodgement of dust from the outsides of the bags or pockets. But heretofore these mechanical means have operated to shake the filter bags or pockets and their contained inserts from the outsides of the closed ends of the bags or pockets—at the dirty or dusty side of the filter assembly.

The primary object of the present invention is to provide a dust collector unit of the form concerned in which dislodgement of dust from the outsides of the filter bags or pockets is effected in an improved manner as will be hereinafter described.

According to this invention, there are arranged to extend into the filter bags or pockets, from the open ends thereof at the clean side of the filter assembly, agitator elements which are adapted to be vibrated for action directly upon and to effect the necessary displacement of the central portions of the flexible mattresses.

The agitator elements, of which at least one extends through the open mouth of and into each filter bag or pocket, may conveniently be provided with actuating portions arranged to co-operate with a common member which is wholly located at the clean side of the assembly and is movable to and fro suchwise as to cause the said elements to agitate the central portions of the flexible mattresses and displace them alternately to opposite sides of the planes containing the insert frames. In this way, the vibrating mechanism at the clean side of the filter causes the mattresses, by direct and positive action thereupon, to beat the bags or pockets from the insides thereof.

In one convenient embodiment of the invention spaced agitator elements in the form of arms are mounted upon a portion of each insert frame located within the open mouth of the corresponding filter bag or pocket, these arms extending straight into the bag or pocket for action upon the central portion of the flexible mattress of the contained insert, and being connected by an actuator which is located on the outside of the bag or pocket at the clean side of the filter assembly and is engaged between locating formations of or on a reciprocable bag-shaking member.

The agitator arms mounted upon the insert frames may advantageously be arranged for limited pivotal movement relatively thereto, so that by oscillating the arm actuators, which may be combined with or form part of outward extensions of the said arms, the latter are also oscillated to vibrate the flexible mattresses.

It is, however, by no means essential that the agitator arms for each flexible mattress and their actuator should be pivotally mounted with respect to the whole of the associated insert frame. Alternatively, a side member of the said frame upon which agitator arms are mounted may itself turn, flex or be otherwise displaceable relatively to the remainder of the frame to an extent sufficient to permit of vibration of the arms when the actuator is acted upon by the common shaking member.

Figure 2:
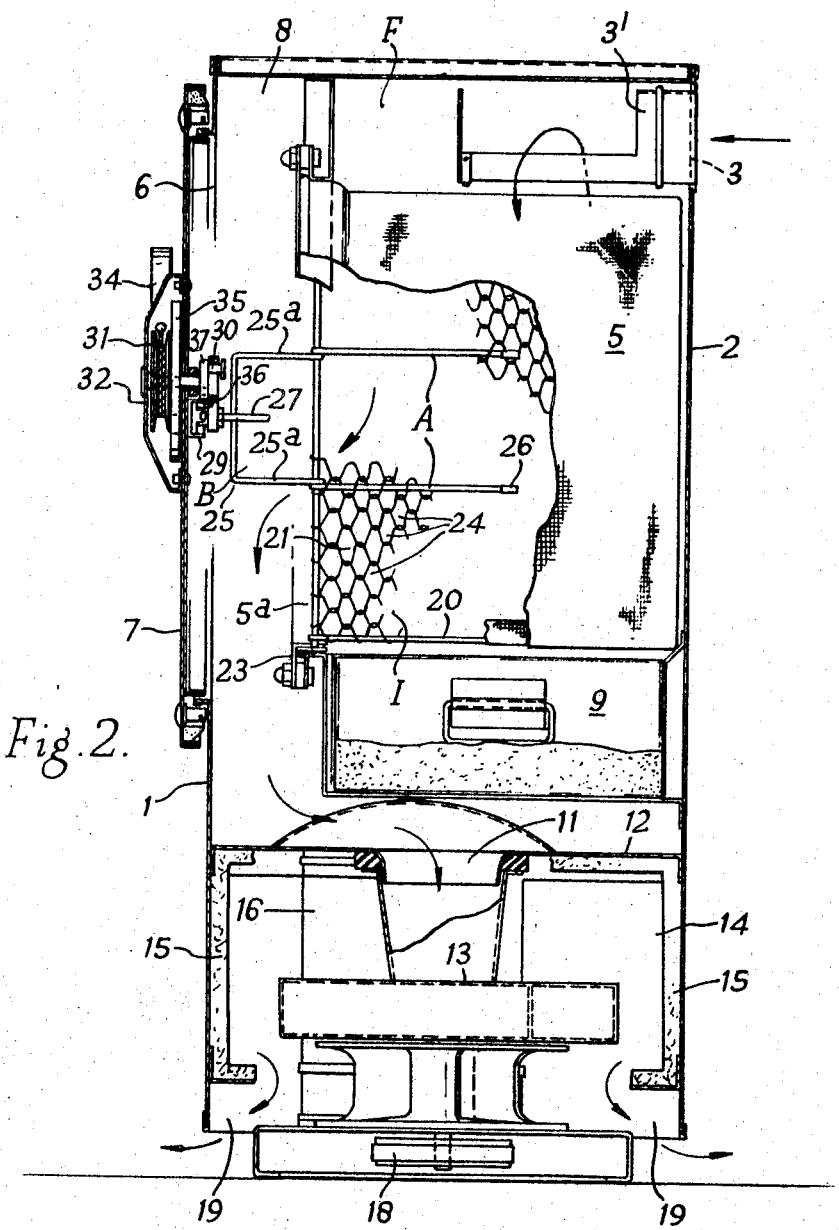
Figure 3:
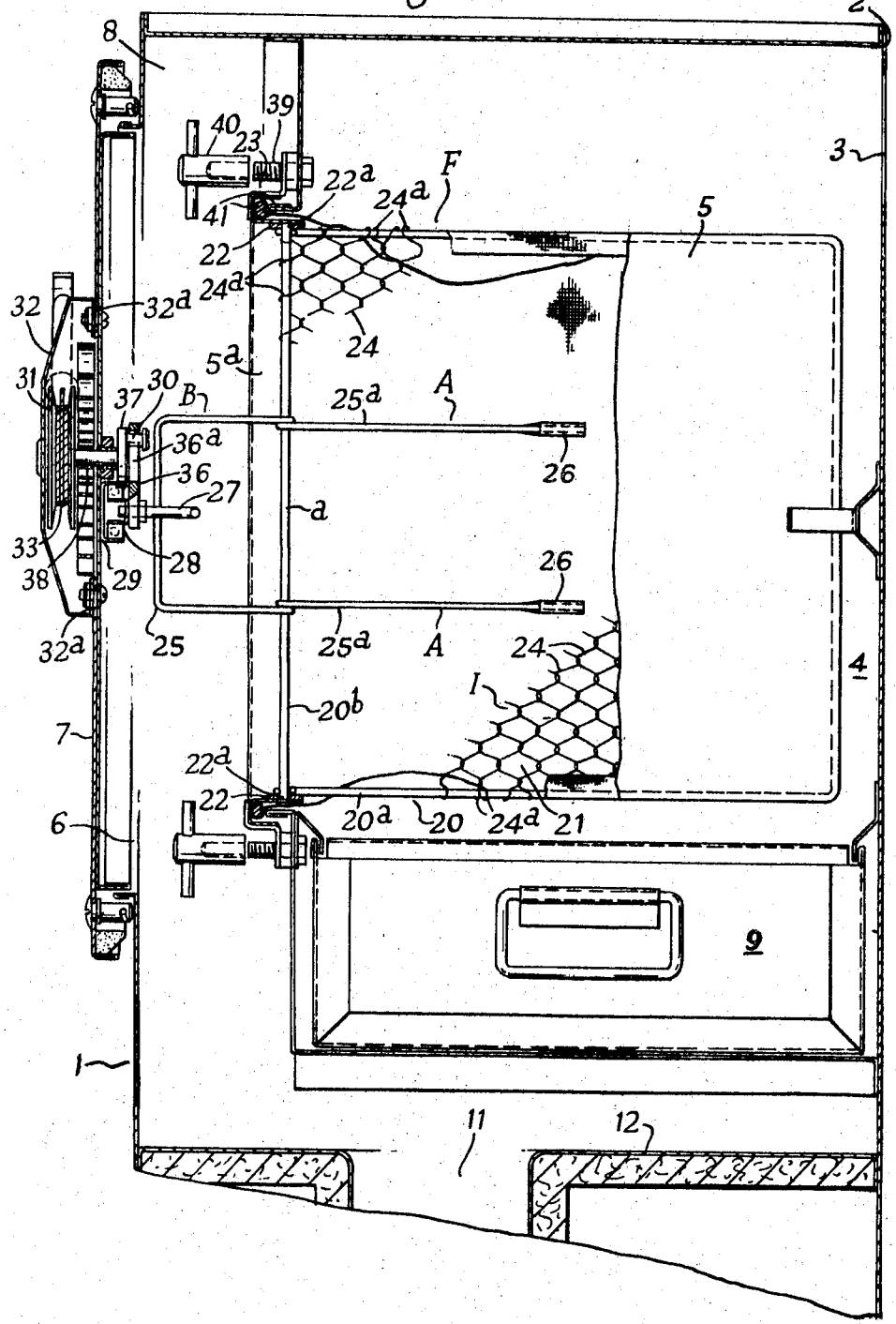
Figure 4:
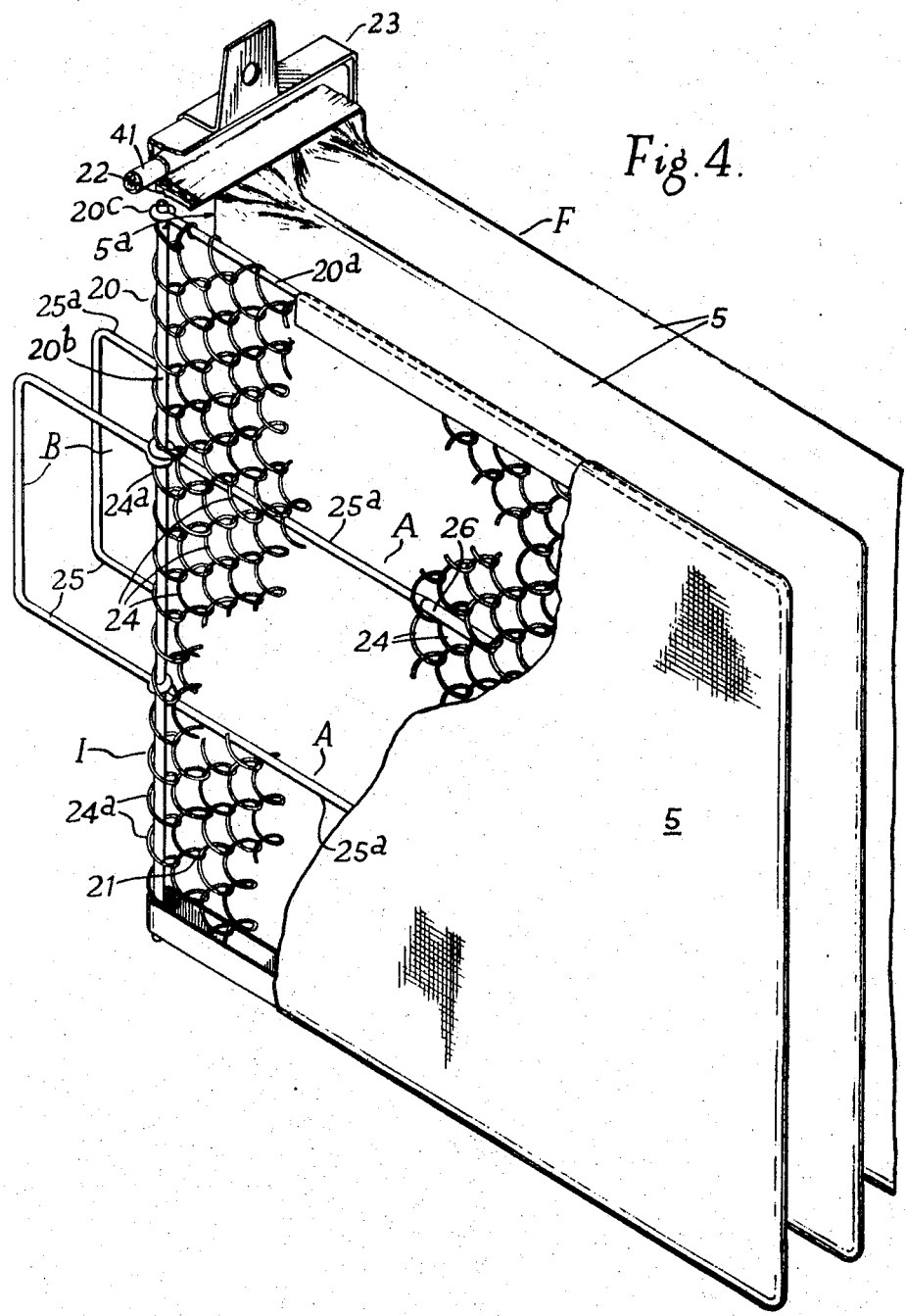
Figure 5:
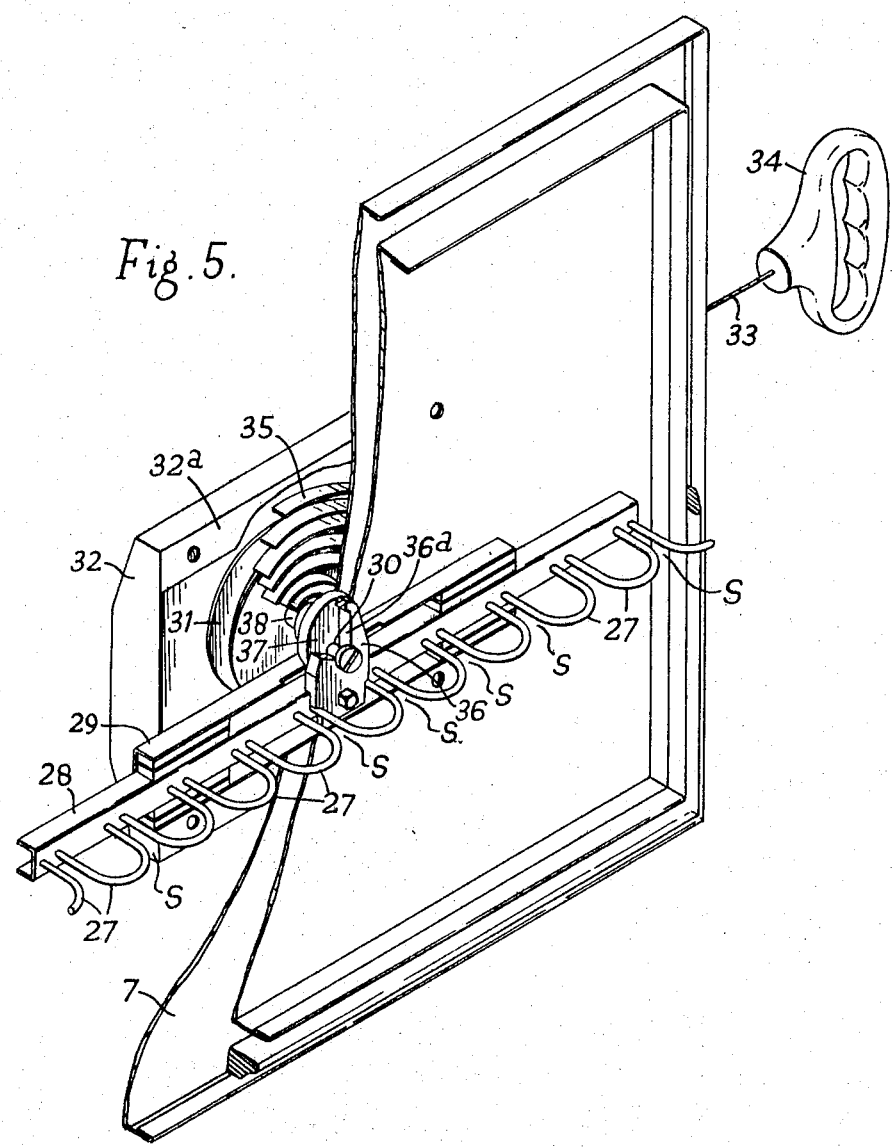
Figure 6:
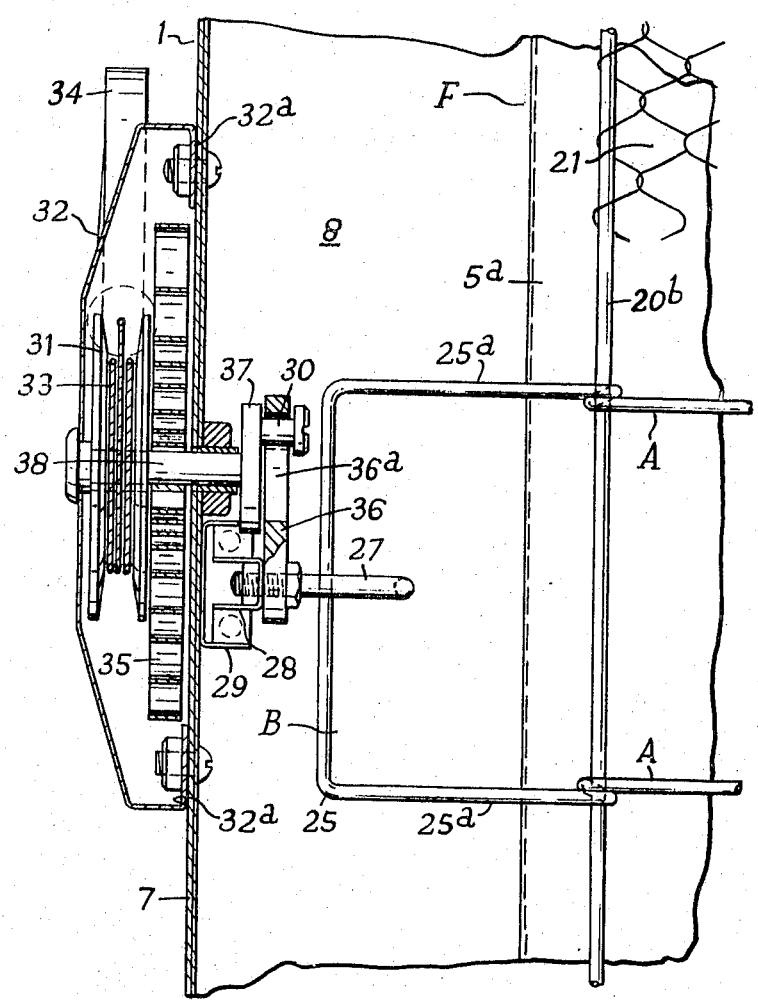

In order that the invention may be more clearly understood and readily carried into practical effect, a specific constructional example thereof will now be described with reference to the accompanying drawings, wherein, FIGURE 1 is a front view of a complete dust collector unit embodying the invention, a part of the removable access door and the front wall of the fan compartment being removed, FIGURE 2 is a vertical sectional view of the said unit, FIGURE 3 is a detail vertical sectional view showing the upper part of the dust collector unit in more detail, FIGURE 4 is a perspective view illustrating some of the bags or pockets in the filter assembly and also one of the agitator elements located in these bags or pockets for agitating the contained flexible mattresses, FIGURE 5 is a perspective view of a fragmentary portion of the aforesaid removable access door, showing a manually rotatable spring-influenced drum which is mounted on this door and is used for operating the bag-shaking member, and FIGURE 6 is a vertical sectional view to a larger scale showing the said drum and the bag-shaking member in greater detail.

Like parts are designated by similar reference characters throughout the drawings.

Referring to FIGURES 1, 2 and 3, it will be seen that the complete dust collector unit comprises a casing 1 in the topmost portion of the closed back 2 of which is formed a contaminated air inlet 3. A filter bag assembly F is supported in an upper compartment 4 of the casing 1, with the open mouths 5a of the bags or pockets 5 vertically disposed. These open mouths face an initially open front 6 of the casing which is adapted to be closed by a readily removable access door 7 thereby forming a filtered air chamber 8. As shown in FIGURE 2, the contaminated air inlet 3 leads into a dirty air distributor 3′ located above the top of the filter assembly F. A dust storage container, such as the drawer indicated at 9, is mounted immediately below the bottom of the filter assembly F. A dust container access door such as 10 (see FIGURE 1) may be provided in either or in each of the opposite sides of the casing 1.

Beneath the filtered air chamber 8 is an opening 11 in a horizontal partition 12 which leads into a fan case 13 accommodated in a fan compartment 14 at the bottom of the unit casing 1. In the fan compartment 14, which has an accoustic lining 15, is also mounted, with its axis vertical, an electric motor 16 from which the fan impeller 17 (FIGURE 1) is conveniently driven by a horizontally disposed belt drive 18. As depicted in FIGURE 2, cleaned air outlets 19 are provided at the bottom of the unit.

In each of the filter bags or pockets 5 there is provided an insert I of an open character which holds apart the sides of bag or pocket to keep the latter open in use and yet permits of the free passage of air therethrough. As previously mentioned, each of these inserts I consists of a relatively rigid frame 20 of the same shape as, and dimensioned to fit within, the corresponding bag or pocket 5, and a normally flat flexible mattress 21 secured right around its periphery to the said frame. Each insert frame 20 is rectangular and, as shown in FIGURES 3 and 4, is made of stout wire comprising a single piece 20a of wire bent substantially into a square-cornered U to form three sides of the frame, and a comparatively short straight piece 20b of wire anchored to the ends of the spaced horizontal limbs of the U to close the open side of and thus complete the frame. This short, straight length 20b of wire constitutes that side of the insert frame 20 which is located in or adjacent to the open mouth 5a of the corresponding filter bag or pocket 5. The ends of the said short, straight wire 20b may conveniently be engaged in eyes or like formations such as 20c provided at the ends of the two parallel spaced limbs of the square-cornered U portion 20a of the frame. In addition, the ends of the straight, short wires 20b are engaged in holes 22a in members 22 of a framework 23 supporting the filter bag assembly F. The flexible mattress 21 of each insert I preferably consists, as shown in the illustrated example, of a plurality of individual helically coiled and interengaged elements 24 which extend straight across the rectangular frame 20 from side to side thereof with their axes parallel to each other. Convolutions or/and other portions such as 24a (FIGURE 3) of these coiled elements 24 are engaged with the four sides of the frame.

Suitably looped around, and extending at right angles to, the short straight wire 20b of each insert frame, at points intermediate their ends, are two straight and parallel spaced limbs 25a of a U-formation 25 bent from stout wire. This U-formation is such as to provide, within the corresponding bag or pocket 5 and at one side of the central portion of the flexible mattress 21, two agitator arms designated A and, on the outside of the bag or pocket 5, adjoining its open mouth 5a, a portion of wire which connects the said two arms and provides a loop-form actuator B for the same. That is to say, the agitator arms A and the connecting actuator loops B integral therewith are disposed at respectively opposite sides of the axis a of the short straight wire 20b carrying them. The inner ends of the agitator arms A, in this particular example, protrude well into the filter bags or pockets 5 and are engaged in loops of the interengaged helically coiled elements 24 in the manner depicted in FIGURE 4 so that lateral displacements of the actuator loops B cause displacements of the flexible mattresses 21 in similar planes by virtues of the agitator arms A acting upon said mattresses. The inner ends of the agitator arms A may, as shown more clearly in FIGURE 3, be furnished with flexible caps or pads 26.

In any event, the actuator loops B for the agitator arms A are engaged in narrow spaces S (see FIGURE 5) provided between a straight series of U-shaped locating formations or elements 27 projecting from the inner side of a horizontally disposed and reciprocable bag-shaking member 28. This member, conveniently of channel section, is longitudinally slidable back and forth within a fixed slideway 29 attached to the back of the access door 7.

It is principally the intention to operate the bag-shaking member 28 from an eccentric pin 30 (or equivalent) provided on a manually rotatable spring-influenced drum 31. The bag-shaking member may, however, be alternatively reciprocated by or from any other appropriate means. But in the illustrated arrangements, the drum 31 is mounted for rotation about a central axis, and a casing 32 accommodating the said drum is secured upon the outside of the access door 7. As will be seen in FIGURE 6, the drum 31 is circumferentially grooved and thereby adapted to receive convolutions of a cable, cord, wire or like elongated flexible element 33 wrapped around it several times, one end of this element being secured to the drum and the opposite end having attached thereto an operating handle 34 (see FIGURE 5). The drum is controlled by a coiled torsion spring 35 (FIGURES 5 and 6) one end of which is anchored to a part or element rotating together with the drum whilst the opposite end is attached to a relatively stationary part. This spring is disposed at one side of and closely adjacent to the drum 31. Thus, by smartly pulling out the handle 34 so that the elongated flexible element 33 is unwound and drawn out straight from the drum 31, the latter will be rotated several revolutions against the spring action. Conversely, by thereupon releasing the handle 34, or at least relieving the outward pressure thereon, the drum will be permitted to rotate in the opposite direction under the spring action so as to re-wind the elongated flexible element 33. Accordingly, by alternately pulling out the handle and allowing it to be drawn in again a number of times respectively against and under the spring influence, the drum 31 can be speedily rotated first in one direction and then in the reverse direction.

At one side thereof the reciprocable bag-shaking member 28 is provided with a plate 36 having therein a vertical slot 36a into which extends the eccentric pin 30. This pin is fitted in a disc 37 secured upon the inner end of the axle 38 of the rotary drum. By virtue of this construction and arrangement, the bag-shaking member 28 will reciprocate to effect shaking or beating of the bags or pockets 5 whenever the drum 31 is rotated in either direction.

The drum casing 32 is of the form shown more clearly in FIGURE 6 and may advantageously be provided with inturned peripheral flanges 32a to enable it to be secured in position. A portion of the wall of the casing 32 provides an abutment to limit the inward movement of the operating handle 34.

As will be appreciated, the arrangement is such that the described mechanism for operating the agitator arms A is removable together with the door 7. These arms A are horizontally disposed and the actuating loops B therefor protrude from the front of the filter assembly F.

Although, in the improved dust collector unit, each filter bag or pocket 5 may be affixed individually and have around its mouth a separate air-tight seal, it is mainly the intention to adopt the illustrated arrangement (disclosed in the specification of our prior United Kingdom Letters Patent No. 905,113) wherein the filter assembly F comprises a plurality of filter bags or pockets 5 made of initially separate pieces of filter material connected together to form a unitary filter element or structure which is removable as a whole from the casing 1 of the unit, and the filter assembly is provided with means such as those indicated at 39 and 40 (FIGURE 3) for assisting in the support thereof within the casing 1. Moreover, any suitable means, such as 41, are provided for forming an airtight seal between the assembly F and the casing. Such an assembly can be readily removed from the casing by unscrewing the clamping nuts 40 and removing them from the associated filter assembly retaining bolts 39, as occasion demands, without disturbing the agitator arms A and their actuators.

The distinctive advantages of this invention are:

(1) There are no moving parts on the dusty side of the filter; abrasion is therefore reduced to a minimum, (2) The improved arrangement permits the dust containing drawer to be situated close to the lower edges of the filter bags or pockets, therefore reducing the overall height of a filter unit.

(3) The herein described cleaning arrangement facilitates the mounting of the filter bags or pockets with their mouths vertical thus enabling a top inlet for the dust laden air to be used. The complete filter pads, acting as flow straighteners, offer less restriction to dust deposition in the drawer and reduce greatly the effect of turbulence therein.

I claim:

1. A dust collector unit comprising, in combination, a casing provided with a contaminated air inlet and at least one clean air outlet spaced from the inlet for the discharge therefrom of cleaned air; a filter assemby including a bank of filter bags which are pervious to air and substantially impervious to dust and mounted within the said casing to divide the casing into a contaminated side between the outside of the bags and the said inlet, and a clean side between the interior of the bags and the outlet each bag having an open mouth facing the said clean side and two generally flat and generally parallel sides, and being arranged side by side in closely spaced relation for the purpose of collecting fine dust on the outsides thereof; insert means mounted in said filter bag for holding apart the sides of the bags to keep the latter open in use and yet permit of the free passage of air therethrough, each of said insert means comprising at least one relatively rigid skeleton frame shaped and dimensioned to fit within the corresponding bag against the inside of one of said generally flat and generally parallel sides of the bag, around the periphery thereof, and a normally flat flexible mattress secured right around its periphery to the said frame, the central portion of the mattress bounded by the frame being laterally displaceable from and to opposite sides of a plane containing the frame for the purpose of beating the sides of the bag; agitator elements mounted at the clean side and extending into each of the filter bags through the open mouths thereof from the clean side and connected at their ends to the central portions of the mattress; and oscillating means positioned wholly at the said clean side for so actuating said agitator elements that they are caused to act directly upon and to effect oscillatory displacements of the aforementioned central portions of the flexible mattresses which as a consequence beat the bags from the insides thereof.

2. A dust collector unit according to claim 1, wherein the agitator elements are provided with actuating portions, and including a common member operatively connected to said actuating portions and movable to and fro in the said clean side to act upon these actuating portions.

3. A dust collector unit according to claim 1, wherein the agitator elements are in the form of spaced agitator arms which arms are mounted upon a portion of each insert frame located within an open mouth of the corresponding filter bag, these arms extending straight into the bag for action upon the central portion of the flexible mattress contained therein and being connected by an actuator loop which is located on the outside of the bag at the said clean side and which loop is engaged in a space between locating elements on a longitudinally reciprocable bag-shaking member.

4. A dust collector unit according to claim 3, wherein the agitator arms mounted upon the insert frames are arranged for limited turning movement so that oscillation of the arm actuator loops also causes the said agitator arms to oscillate and so vibrate the flexible mattresses.

5. A dust collector unit according to claim 3, wherein each actuator loop is formed integrally with outward extensions of a pair of said spaced agitator arms.

6. A dust collector unit according to claim 3, wherein said insert frames include side members upon which the agitator arms are mounted, and which are adapted to be displaced relative to the remainder of their respective frames to extents sufficient to permit vibration of the arms when the actuator loops are acted upon by the reciprocable bag-shaking member.

7. A dust collector unit comprising, in combination, a casing provided with a contaminated air inlet and at least one clean air outlet spaced from the inlet for the discharge therefrom of cleaned air; a filter assembly including a bank of filter bags which are pervious to air and substantially impervious to dust and mounted within the said casing to divide the casing into a contaminated side between the outside of the bags and the said inlet, and a clean side between the interior of the bags and the said outlet, each bag having an open mouth facing the said clean side and two generally flat and generally parallel sides, and the bags being arranged side by side in closely spaced relation for the purpose of collecting fine dust on the outsides thereof; insert means mounted in said bags for holding the sides of the bags to keep the latter open in use and yet permit of the free passage of air therethrough, said insert means comprising relatively rigid skeleton insert frames shaped and dimensioned to fit within the corresponding bag against the inside of one of the said generally flat and generally parallel sides of the bag, around the periphery thereof, and a normally flat flexible mattress secured right around its periphery to each said frame, the central portion of the mattress bounded by each frame being laterally displaceable from and to opposite sides of a plane containing the frame for the purpose of beating the sides of the bag; said insert frame each being rectangular and made of stout wire comprising a single piece of wire bent into a square-cornered U to form three sides of the frame and a comparatively short straight piece of wire engaged in eyes at the ends of the spaced limbs of the U. to close the open side of and thus complete the frame, said short straight piece constituting that side of the insert frame located in the open mouth of the corresponding filter bag; a framework which supports the filter bag assembly and includes members having formed therein holes in which the ends of the short straight pieces of wire are engaged; U shaped members bent from stout wire and having spaced limbs which are looped around and extend at right angles to the aforesaid short straight pieces of wire, there being one such U shaped member on each insert frame and this member being such as to provide, within the corresponding filter bag and at one side of the corresponding flexible mattress, two adjacent agitator arms connected at their ends to the central portion of the corresponding flexible mattress and, on the outside of the bag adjoining its open mouth at the said clean side a loop portion of wire which connects the said two arms and provides an actuator for the same; and a reciprocable bag-shaking member located at the said clean side and having elements thereon for acting upon the actuators to vibrate the agitator arms and causing the flexible mattresses to beat the bags from the insides thereof.

8. A dust collector unit according to claim 7, wherein the flexible mattress of each bag insert means includes a plurality of individual helically coiled and interengaged elements which extend completely across the rectangular insert frame, and the inner ends of the corresponding agitator arms are engaged in loops of some of the said interengaged elements.

9. A dust collector unit according to claim 7, wherein the agitator arm actuators are engaged in spaces provided between a straight series of U-shaped locating elements projecting from the inner side of the reciprocable bag-shaking member.

10. A dust collector unit comprising, in combination, a casing provided with a contaminated air inlet and at least one clean air outlet spaced from the inlet for the discharge therefrom of cleaned air; a filter assembly including a bank of filter bags which are pervious to air and substantially impervious to dust and mounted within the said casing to divide the casing into a contaminated side between the outside of the bags and the inlet and a clean side between the interior of the bags and the outlet, each bag having an open mouth facing the said clean side and two generally flat and generally parallel sides, and being arranged side by side in closely spaced relation for the purpose of collecting fine dust on the outsides thereof; insert means mounted in said filter bags for holding apart the sides of the bags to keep the latter open in use and yet permit of the free passage of air therethrough, each of said insert means comprising at least one relatively rigid skeleton frame shaped and dimensioned to fit within the corresponding bag against the inside of one of the said generally flat and generally parallel sides of the bag, around the periphery thereof, and a normally flat flexible mattress secured right around its periphery to the said frame, the central portion of the mattress bounded by the frame being laterally displaceable from and to opposite sides of a plane containing the frame for the purpose of beating the sides of the bag; agitator elements mounted at the clean side and extending into each of the filter bags through the open mouths thereof from the clean side and connected at their ends to the central portions of the mattress; a reciprocable bag-shaking means located wholly at the said clean side for actuating said agitator elements causing them to act directly upon and to effect oscillatory displacements of the central portions of the flexible mattresses which as a consequence beat the bags from the insides thereof; a drum mounted for rotation about a central axis, a torsion spring influencing said drum; manually operable means for rotating the drum in one direction against the spring influence, the arrangement being such that upon release of the said manually operable means the drum will automatically rotate in the opposite direction under the spring influence; and an eccentric pin associated with the drum for reciprocating the bag-shaking member.

11. A dust collector unit according to claim 10, wherein the drum is circumferentially grooved to accommodate convolutions of an elongated flexible element wrapped around it several times, one end of said element being secured to the drum and the opposite end having attached thereto an operating handle.

12. A dust collector unit according to claim 10, wherein the reciprocable bag-shaking member is provided with a plate having therein a slot in which extends the eccentric pin.

13. A dust collector unit comprising, in combination, a casing which has a contaminated air inlet formed in the topmost portion of one of its walls and cleaned air outlets in its bottom, the front of said casing being initially open; a removable access door which closes said front opening and completes a filtered air chamber within said casing; a horizontal partition which has an opening therein and divides the casing into upper and lower compartments; a filter assembly located in said upper compartment and including a bank of filter bags to divide the casing into a contaminated side between the outside of the bags and the said inlet, and a clean side between the interior of the bags and the said outlet, said bags having open mouths vertically disposed and facing the access door at the said clean side and two generally flat and generally parallel sides, said bags being arranged side by side in closely spaced relation for the purpose of collecting fine dust on the outsides thereof; a dirty air distributor located above the top of the filter assembly and into which the contaminated air inlet leads; insert means mounted in said filter bags for holding apart the sides of the bags to keep the latter open in use and yet permit of the free passage of air therethrough, each of said insert means comprising at least one relatively rigid skeleton frame shaped and dimensioned to fit within the corresponding bag against the inside of one of said generally flat and generally parallel sides of the bag, around the periphery thereof, and a normally flat flexible mattress secured right around its periphery to the said frame, the central portion of the mattress bounded by the frame being laterally displaceable from and to opposite sides of a plane containing the frame for the purpose of beating the sides of the bag; horizontal agitator arms mounted at the clean side and extending into each of the filter bags through the vertical open mouths thereof at the said clean side and connected at their ends to the central portions of the mattress; actuators for the agitator arms which protrude from the front of said casing and are operable to cause the agitator arms to act upon and effect oscillatory lateral displacements of the central portions of the flexible mattresses which as a consequence beat the bags from the insides thereof; means for operating the agitator arms by moving the actuators to cause the agitator arms to effect said mattress displacements which operating means is mounted upon the access door and is removable together therewith; and a fan located in the aforementioned lower compartment and the impeller casing of which communicates with the opening in the horizontal partition.

14. A dust collector unit according to claim 13, wherein a dust storage drawer is mounted in the casing immediately below the bottom of the filter assembly.

15. A dust collector unit according to claim 13, wherein there is mounted within the fan compartment, with its axis vertical, an electrical motor from which the fan impeller is driven by a horizontal drive.

16. A dust collector unit according to claim 13, wherein the filter bags are formed of separate pieces of filter material connected together to form a unitary filter element which is removable as a whole from the casing, means being provided to support the assembly within said casing.

References Cited

UNITED STATES PATENTS

| 1,303,008 | 5/1919 | Anderson | 55—300 |
| 1,404,017 | 1/1922 | Ettner | 74—137 |
| 2,057,578 | 10/1936 | Kleissler | 55—305 |
| 2,072,906 | 3/1937 | Rosenberger | 55—300 |
| 2,507,335 | 5/1950 | Donohue | 55—341 |
| 2,559,602 | 7/1951 | Denman | 74—137 |
| 2,575,148 | 11/1951 | Vokes | 55—300 |
| 2,945,554 | 7/1960 | Berly | 55—341 |
| 3,246,456 | 4/1966 | Sharp | 55—500 |

FOREIGN PATENTS

| 800,195 | 8/1958 | Great Britain. |
| 873,650 | 7/1961 | Great Britain. |
| 905,113 | 8/1962 | Great Britain. |
| 139,970 | 4/1953 | Sweden. |

FRANK W. LUTTER, *Primary Examiner.*

HARRY B. THORNTON, *Examiner.*

B. NOZICK, *Assistant Examiner.*